UNITED STATES PATENT OFFICE.

WILLIAM GRAY BLAKE AND JACOB MILLARD DENNETT, OF CASTINE, MAINE.

COMPOSITION FOR PREVENTING MILDEW ON CANVAS.

SPECIFICATION forming part of Letters Patent No. 673,858, dated May 14, 1901.

Application filed February 21, 1901. Serial No. 48,219. (No specimens.)

*To all whom it may concern:*

Be it known that we, WILLIAM GRAY BLAKE and JACOB MILLARD DENNETT, citizens of the United States, residing at Castine, in the county of Hancock and State of Maine, have invented a certain new and useful Composition of Matter for Prevention of Mildew upon Canvas; and we do hereby declare the following to be a full, clear, and exact description of the invention, such as will enable others skilled in the art to which it appertains to make and use the same.

Our composition consists of the following ingredients, combined in the proportions stated, viz: one hundred and eighty (180) gallons of water, three (3) pounds of blue vitriol, ten (10) pounds of lime, and one (1) pound of bicarbonate of soda. These ingredients are to be thoroughly mingled by agitation.

Our composition is especially designed for use upon sails and awnings, and in application the canvas is simply immersed in the composition and soaked for about ten hours. Thus treated the canvas, though exposed to ordinary atmospheric conditions, will remain unaffected by mildew for an indefinite period.

Having thus described our invention, what we claim, and desire to secure by Letters Patent, is—

The herein-described composition of matter for preventing mildew upon canvas consisting of pure water one hundred and eighty (180) gallons, blue vitriol three (3) pounds, lime ten (10) pounds, and bicarbonate of soda one (1) pound substantially as described.

WILLIAM GRAY BLAKE.
JACOB MILLARD DENNETT.

Witnesses:
GEO. M. WARREN,
ERNEST GRAY.